United States Patent [19]
Edlund

[11] Patent Number: 5,861,137
[45] Date of Patent: Jan. 19, 1999

[54] STEAM REFORMER WITH INTERNAL HYDROGEN PURIFICATION

[76] Inventor: David J. Edlund, 6575 NW. Atkinson Ave., Redmond, Oreg. 97756

[21] Appl. No.: 741,057

[22] Filed: Oct. 30, 1996

[51] Int. Cl.$^6$ ................ C01B 3/26; B01J 8/08; B01J 8/02

[52] U.S. Cl. .............. 423/652; 423/655; 48/76; 48/127.7; 48/127.9; 422/217; 422/218

[58] Field of Search .............. 48/76, 127.7, 127.9, 48/63; 422/217, 218; 423/652, 653, 654, 655

[56] References Cited

U.S. PATENT DOCUMENTS

| | | | |
|---|---|---|---|
| 3,849,076 | 11/1974 | Gryaznov et al. | 422/149 |
| 4,329,157 | 5/1982 | Dobo et al. | 55/16 |
| 4,654,063 | 3/1987 | Auvil et al. . | |
| 4,684,581 | 8/1987 | Struthers | 429/19 |
| 4,713,234 | 12/1987 | Weirich et al. | 423/648 R |
| 4,810,485 | 3/1989 | Marianowski et al. | 423/648.1 |
| 5,326,550 | 7/1994 | Adris et al. | 423/652 |
| 5,354,547 | 10/1994 | Madhukar et al. . | |
| 5,509,942 | 4/1996 | Dodge | 29/623.2 |
| 5,612,012 | 3/1997 | Soma et al. . | |
| 5,637,259 | 6/1997 | Galuszka et al. . | |
| 5,639,431 | 6/1997 | Shirasaki et al. | 422/212 |
| 5,658,681 | 8/1997 | Sato et al. . | |
| 5,705,916 | 1/1998 | Rudbeck et al. | 322/2 R |

OTHER PUBLICATIONS

Compact, Lightweight Fuel Reformer for Fuel Cells Jun. 1996—Avgonne National Laboratory/US. Dept. of Energy.
The Practical Use of Metal—Membrane Reactors for Industrial Apps. Membrane Technology Reviews, Nov. 1994 pp. 89–97.
On Board Hydrogen Purification for Steam Reformer/REM Fuel Cell Vehicle Power Plants/Hydrogen Energy Progress X, Jun. 1994, pp. 1681–1690.
Palladium Alloys for Hydrogen Diffusion Membranes, A.G. Knapton Platinum Metals Rev. 21 (1977) pp. 44–50.
Catalytic Palladium—Based Membrane Reactors: A Review, J. Shu, et al. Canadian Journal of Chemical Engineering, vol. 69, Oct. 1991.
Steam Reforming of Natural Gas with Integrated Hydrogen Separation for Hydrogen Production/Chem. Eng. Technol. 10 (1987) pp. 248–255.
Experimental Studies of a Ceramic Membrane Reactor for the Steam/Methane. Reaction at Moderate Temperatures (400°–700° C), R.G. Minet, et, al. Symposium on Natural Gas Upgrading II, Meeting of American Chemical Society, Apr. 1992, pp. 245–248.
Promotion of Methane Steam Reforming Using Ruthenium–Dispersed Microporous Alumina Membrane Reactor, M. Chai, et al, Chemistry Letters, Chemical Society of Japan, 1993, pp. 41–44.
A Fluidized Bed Membrane Reactor for the Steam Reforming of Methane, A.M. Adris, et al, Can. Journal of Chem. Eng., vol. 69, Oct. 1991 pp. 1061–1070.

*Primary Examiner*—Nina Bhat
*Attorney, Agent, or Firm*—Kolisch, Hartwell, Dickinson, McCormack & Heuser

[57] ABSTRACT

A steam reformer with internal hydrogen purification includes internal bulk hydrogen purification, internal hydrogen polishing to remove trace levels of carbon monoxide and carbon dioxide, an integrated combustion method utilizing waste gas to heat the reformer, efficient integration of heat transfer, and a compact design. The steam reformer shown includes a concentric cylindric architecture nesting an annular combustion region, an annular reforming region, an annular hydrogen transport region, and a cylindrical polishing region.

21 Claims, 2 Drawing Sheets

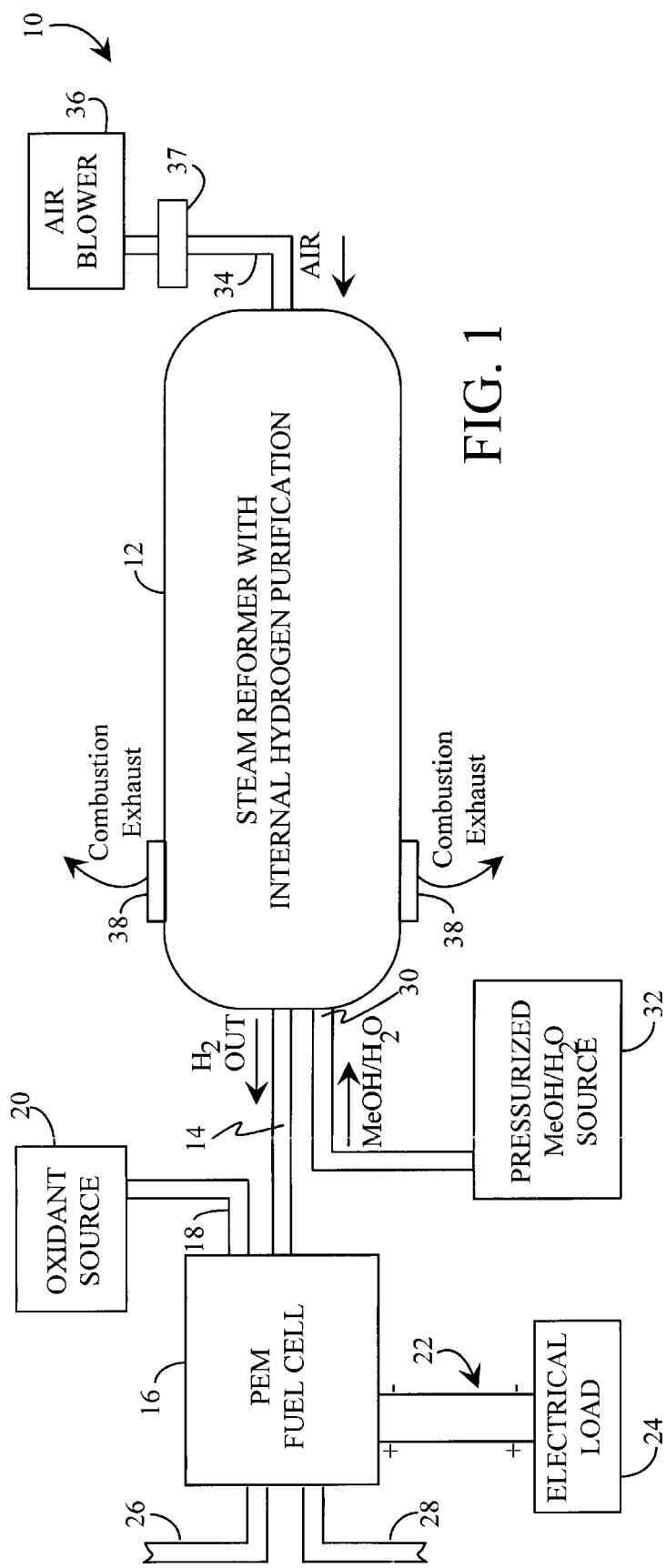
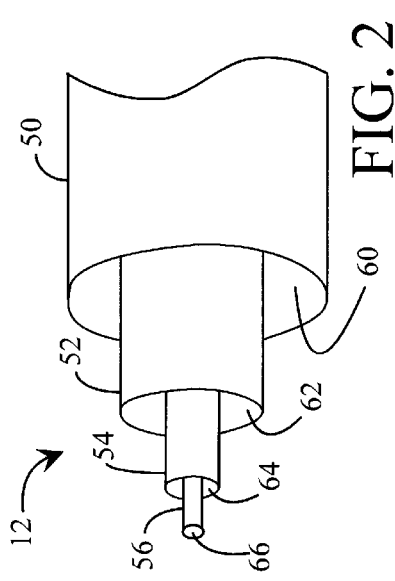

STEAM REFORMER WITH INTERNAL HYDROGEN PURIFICATION

BACKGROUND OF THE INVENTION

The present invention relates generally to energy conversion, and particularly to a process and apparatus for production of purified hydrogen by steam reforming.

Purified hydrogen is an important fuel source for many energy conversion devices. For example, fuel cells use purified hydrogen and an oxidant to produce an electrical potential. A process known as steam reforming produces by chemical reaction hydrogen and certain byproducts or impurities. A subsequent purification process removes the undesirable impurities to provide hydrogen sufficiently purified for application to a fuel cell.

Under steam reforming, one reacts steam and alcohol, (methanol or ethanol) or a hydrocarbon (such as methane or gasoline or propane), over a catalyst. Steam reforming requires elevated temperature, e.g., between 250 degrees centigrade and 800 degrees centigrade and produces primarily hydrogen and carbon dioxide. Some trace quantities of unreacted reactants and trace quantities of byproducts such as carbon monoxide also result from steam reforming.

Trace quantities of carbon monoxide, certain concentrations of carbon dioxide, and in some cases unreacted hydrocarbons and alcohols will poison a fuel cell. Carbon monoxide adsorbs onto the platinum catalyst of the fuel cell and inhibits operation of the fuel cell, i.e., reduces the power output of the fuel cell. To a lesser degree, carbon dioxide and other hydrocarbons and alcohols have the same result. All impurities to some extent reduce by dilution the partial pressure of hydrogen in the fuel cell and thereby reduce power output of the fuel cell. Thus, fuel cells require an appropriate fuel input, i.e., purified hydrogen with no additional elements that would contribute to a loss in efficiency for the fuel cell.

Traditionally, in the process of hydrogen purification one attempts to always maximize harvest of hydrogen from the reforming process. To maximize the amount of hydrogen obtained, a relatively expensive device, e.g., a thick and high quality palladium membrane, serves as a hydrogen-permeable and hydrogen-selective membrane. Such thick, high quality palladium alloy membranes support maximum harvest of hydrogen with minimal, i.e., acceptable, impurities for use in a fuel cell. To achieve such high level of purification, however, one invests heavily in an expensive membrane.

Traditionally, the process of steam reforming and the subsequent process of hydrogen purification occur in separate apparatus. The advantages of combining steam reforming and hydrogen purification in a single device are known. An integrated steam reforming and hydrogen purification device should provide a more compact device operating at lower temperatures not limited by the normal equilibrium limitations. Unfortunately, such a device has yet to be reduced to practical design. Where theory in this art recognizes the advantage of combining steam reformation and hydrogen purification in a single device, the art has yet to present a practical, i.e., economical, design.

Thus, a practical integrated steam reforming and hydrogen purification device has not yet become available. The subject matter of the present invention proposes a solution to this need for a combined steam reforming and hydrogen purification device.

SUMMARY OF THE INVENTION

A process for producing hydrogen containing concentrations of carbon monoxide and carbon dioxide below a given level begins by reacting an alcohol vapor (such as methanol) or a hydrocarbon vapor (such as propane) and steam to produce product hydrogen, carbon monoxide, and carbon dioxide. The reacting step occurs in the vicinity of a hydrogen-permeable and hydrogen-selective membrane and the product hydrogen permeates the membrane. Since the membrane is likely to have holes and other defects, concentrations of the carbon monoxide and carbon dioxide above said given level also pass through the membrane. A methanation catalyst bed lies at the permeate side of the membrane and is heated whereby carbon monoxide and carbon dioxide in the methanation catalyst bed convert to methane and yield a product hydrogen stream with concentrations of carbon monoxide and carbon dioxide below said given level. Optionally, reforming catalyst may also lie at the permeate side of the membrane along with the methanation catalyst to convert to product hydrogen any unreacted alcohol or hydrocarbon feed that passes through holes or other defects in the membrane. The process concludes by withdrawing the product hydrogen from the methanation catalyst bed.

A steam reformer under the present invention includes a tubular hydrogen-permeable and hydrogen selective membrane. A reforming bed surrounds at least part of the membrane. An inlet to the reforming bed receives a mixture of alcohol or hydrocarbon vapor and steam and an outlet from the reforming bed releases reforming byproduct gasses. A heating element heats the reforming bed to an operating temperature and a second bed including a methanation catalyst is placed at the permeate side of the membrane. A reformer outlet withdraws hydrogen gas from the second bed. According to one aspect of the present invention, the heating element is a third bed including an oxidation catalyst surrounding at least a portion of the first bed. The reforming byproduct gasses released from the reforming bed mix with an air source and catalytically ignite to generate heat and thermally support the process of reforming within the reforming bed. In accordance with another aspect of the present invention, the reformer receives a liquid alcohol or hydrocarbon and liquid water feed and vaporizes the alcohol or hydrocarbon and eater by use of heat generated in the oxidation catalyst bed. Under the present invention, fuels applied to the oxidation catalyst bed include a selected amount of hydrogen allowed into the reforming byproduct gasses to support the reforming process without requiring an additional fuel source.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 1 illustrates generally an energy conversion system including a fuel cell and a steam reformer with internal hydrogen purification according to a preferred form of the present invention.

FIG. 2 illustrates schematically a concentric, cylindric architecture for the steam reformer with internal hydrogen purification of FIG. 1.

DETAILED DESCRIPTION OF THE PREFERRED EMBODIMENT

Figure 3:
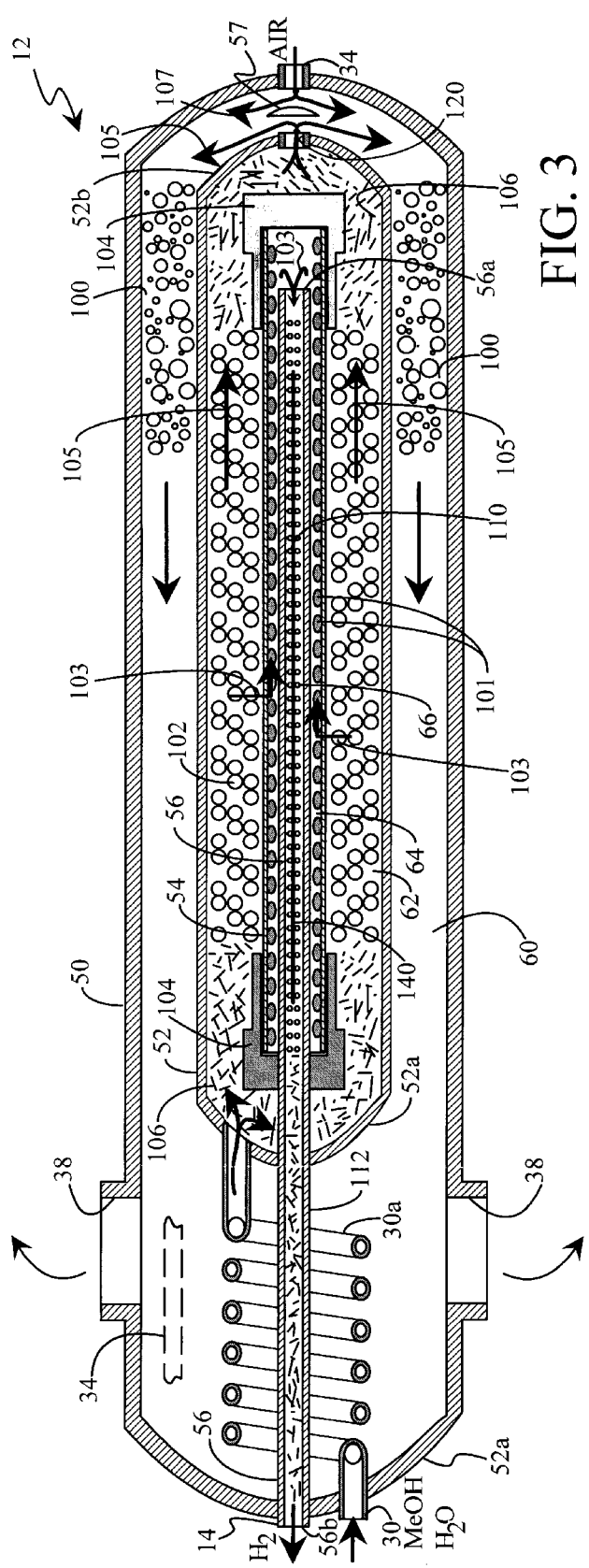
FIG. 3 illustrates in cross section the steam reformer with internal hydrogen purification of FIG. 1.

FIG. 1 shows an energy conversion system 10 employing a steam reformer with internal hydrogen purification (reformer) 12 according to a preferred form of the present invention. Reformer 12 provides at its outlet 14 purified hydrogen to a PEM fuel cell 16. Fuel cell 16 receives at its inlet 18 an oxidant from oxidant source 20. Fuel cell 16 produces an electrical potential 22 for application to an electrical load 24, e.g., an electrical motor. Fuel cell 16 also includes outlets 26 and 28 serving as fuel and oxidant outlets, respectively.

For purposes of describing operation of reformer 12, the liquid feedstock will be methanol (MeOH) and water, although other alcohols or hydrocarbons may be used in place of methanol. Reformer 12 receives at its fuel inlet 30 pressurized liquid methanol and water from a pressurized methanol/water source 32. As described more fully hereafter, the pressurized mix of liquid methanol and water vaporizes within reformer 12 and reacts with a reforming catalyst to produce a hydrogen stream and a byproduct stream. A hydrogen-selective membrane separates the hydrogen stream from the byproduct stream. The hydrogen stream passes, by pressure differential, through the membrane and subsequently through a polishing catalyst to appear at the outlet 14 of reformer 12.

While traditional reforming technology allows a high percentage of hydrogen produced to be taken across a selective membrane, the process and apparatus of the present invention takes less than a maximum amount of hydrogen across the selective membrane. The present invention thereby allows use of a lesser-grade and less expensive selective membrane. In addition, because less than the maximum amount of hydrogen is separated as a product stream, the required membrane area is also reduced by the present invention. The remaining portion of hydrogen enters the byproduct stream, mixes with air provided at inlet 34 by air blower 36, and reacts with a combustion catalyst within reformer 12 to support elevated temperatures needed for steam reforming within reformer 12. Reformer 12 uses the byproduct stream, including a selected amount of hydrogen remaining therein, as a fuel source for its combustion process. No additional fuel source is applied to reformer 12 to support combustion. Reformer 12 also includes a plurality of combustion exhaust ports 38 releasing combustion byproducts.

The optimum amount of hydrogen to recover as a product stream is calculated from the heating value (enthalpy of combustion) of hydrogen. Sufficient hydrogen must be supplied in the byproduct stream to the catalytic combustion region so that the heat of combustion exceeds the total heat requirement of the reformer. The total heat requirement of the reformer ($\Delta H_{total}$) is given by $$\Delta H_{total} = \Delta H_{rxn} + \Delta H_{vap} + \Delta H_{cp} + \Delta H_{loss}$$

where $\Delta H_{rxn}$ is the enthalpy of the reforming reactions; $\Delta H_{vap}$ is the enthalpy of vaporization of the liquid feed stock; $\Delta H_{cp}$ is the enthalpy required to heat the vaporized feed stock to the reforming temperature; and $\Delta H_{loss}$ is the heat lost to the surrounding environment. Heat loss from the reformer is minimized (and reduced to a negligible degree) with adequate insulation.

In the case of steam reforming methanol according to the following reaction stoichiometry

$$CH_3OH + H_2O \rightleftharpoons CO_2 + 3H_2$$

8.4 gmole methanol and 8.4 gmole water are required to yield sufficient hydrogen (21 std. ft$^3$) to generate about 1 kW$_e$. Assuming no heat loss and no heat exchange (between discharged hot streams and the relatively cold feed stock stream) $\Delta H_{total}$ is 300 kcal. Since the heat of combustion for hydrogen is 57.8 kcal/gmole, approximately 5.2 gmoles of hydrogen (4.3 std.ft$^3$) must be combusted to provide the required 300 kcal of heat for steam reforming sufficient methanol to generate 1 kW$_e$. So, 70% to 80% of the hydrogen produced in the reformer is recovered as a product stream and the remaining 20% to 30% of the hydrogen is passed to the catalytic combustor in the byproduct stream to provide a fuel stream with sufficient heating value to meet the heating requirements ($\Delta H_{total}$) of the reformer.

FIG. 2 illustrates schematically the concentric cylindric architecture of steam reformer 12. In FIG. 2, reformer 12 includes in concentric relation an outermost metal tube 50, an inner metal tube 52, a hydrogen-selective membrane tube 54, and an innermost metal tube 56. Tubes 50, 52, 54, and 56 are of successively smaller diameter and arranged in concentric relation to one another. An annular combustion region 60 exists in the space within tube 50 but external of tube 52. An annular reforming region 62 exists within tube 52 but external of membrane tube 54. An annular hydrogen transport region 64 exists within membrane tube 54, but external of tube 56. A cylindric polishing region 66 resides within the metal tube 56.

FIG. 3 illustrates in cross section the steam reformer 12. In FIG. 3, outermost metal tube 50, a generally closed-end tubular structure, receives at one end via inlet 34 an air supply and releases at combustion ports 38 combustion byproducts. Within combustion region 60, a combustion catalyst 100 resides near air inlet 34. Alternatively, combustion catalyst 100 may be arranged as a plurality of bands spaced at intervals within said combustion region 60. Suitable combustion catalyst materials include platinum supported on alumina or other inert and thermally-stable ceramic. Inlet 30, carrying the pressurized mix of methanol and water, passes through the end wall of tube 50 and forms a coil 30a wrapping about the innermost metal tube 56 within the combustion region 60, although said metal tube 56 need not necessarily pass through the axis of coil 30a. The distal end of coil 30a passes through the closed end 52a of tube 52 and opens into the reforming region 62. The pressurized mix of liquid methanol and water entering coil 30a vaporizes at the elevated temperatures of combustion region 60 and enters the reforming region 62 as vapor.

Within reforming region 62 a reforming catalyst 102 (e.g., BASF catalyst K3-110 or ICI catalyst 52-8) reacts with the vaporized mix of methanol and water to produce hydrogen in the vicinity of the membrane tube 54. Membrane tube 54 is composed of one of a variety of hydrogen-permeable and hydrogen-selective materials including ceramics, carbon, and metals. Especially preferred materials for fabricating said membrane tube 54 are hydrogen-permeable palladium alloys, e.g., palladium alloyed with 10–30 wt % silver. Each end of membrane tube 54 is sealed by a metal cap 104. A metal gauze 106 within the reforming region 62 surrounds each cap 104 and maintains the catalyst 102 within region 62 and in the vicinity of membrane tube 54. A hydrogen stream 103 migrates by pressure differential through membrane tube 54 and into hydrogen transport region 64. A thin membrane tube 54 requires support against deformation under the pressure differential between reforming region 62 and hydrogen transport region 64. For this purpose, a tension spring 101 supports membrane tube 54 from within while allowing hydrogen stream 103 to pass by, into and along transport region 64.

Hydrogen stream 103 travels within transport region 64 toward the open end 56a of tube 56. Hydrogen stream 103 includes some impurities, e.g., carbon monoxide, carbon dioxide and unreacted methanol and water vapor, also travelling along transport region 64 and into innermost tube 56 at its open end 56a. All of hydrogen stream 103 enters the open end 56a of innermost tube 56.

Within tube 56 a polishing catalyst 110 reacts with impurities in the hydrogen stream 103 passing therethrough. Metal gauze 112 downstream from catalyst 110 holds catalyst 110 within tube 56. Polishing catalyst 110 (e.g., BASF catalyst G1-80 or ICI catalyst 23-1) reacts with certain impurities remaining in hydrogen stream 103, e.g., as much as 1% of carbon monoxide and carbon dioxide, and converts such impurities to innocuous byproducts, e.g., methane. Stream 103 of purified hydrogen and innocuous byproducts passes through metal gauze 112 and exits reformer 12 at the outlet 14, i.e., at the opposite end 56b of tube 56.

Polishing catalyst 110 may be several separate catalysts within tube 56. In order to deal with carbon monoxide and carbon dioxide impurities, one uses a methanation catalyst. The process of methanation, i.e., reacting carbon monoxide or carbon dioxide with hydrogen to yield methane as shown below, is well known.

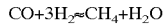
$CO+3H_2 \rightleftharpoons CH_4+H_2O$

$CO_2+4H_2 \rightleftharpoons CH_4+2H_2O$

Methanation provides an acceptable polishing step because methane is considered relatively inert or innocuous to the fuel cell whereas carbon dioxide and carbon monoxide are poisonous to the fuel cell.

If reformer 12 uses methanol in the steam reforming step, and leaks in the membrane tube 54 allow carbon monoxide and carbon dioxide to pass into the hydrogen stream 103, some unreacted methanol and water vapor may exist in the hydrogen stream 103. To convert such unreacted methanol into a harmless byproduct prior to admitting it into the fuel cell, the reforming catalyst 100, which is a low temperature copper/zinc shift catalyst, is placed through a portion (e.g., one-fourth to one-third) of the polishing catalyst bed, i.e., innermost tube 56, followed downstream by a methanation catalyst. The predominant chemical reaction for steam reforming methanol is shown below.

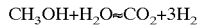
$CH_3OH+H_2O \rightleftharpoons CO_2+3H_2$

Returning to reforming region 62, steam reforming byproduct stream 105 moves toward closed end 52b of tube 52 and through critical orifice 120 serving as an outlet for tube 52 and discharging near air inlet 34. Optionally, deflector 57 directs the flow of said byproduct stream and air toward combustion catalyst 100. Byproduct stream 105 thereby encounters and mixes with the inflow 107 of air at inlet 34. Air inflow 107 may be preheated to enhance the catalytic ignition within combustion region 60. For example, an air heater 37 (FIG. 1) may be provided in series along the inlet 34 to reformer 12. Alternatively, inlet 34 may be routed through combustion region 60 as shown schematically in FIG. 3. The resulting mixture travels toward and through combustion catalyst 100 and ignites thereat. The combustion byproducts then travel through combustion region 60 and eventually, after heating coil 30a and thermally supporting the steam reforming process within region 62, exit reformer 12 at the combustion exhaust ports 38.

Reformer 12 operates at a relatively lower temperature than conventional steam reforming devices. Because reformer 12 continually purifies hydrogen as it is produced, the steam reforming reaction may be conducted well away from its equilibrium limitation. Unreacted reactants in the relatively lower temperature reforming process tend to be eventually reacted due to the continuous siphoning of hydrogen from the process. Under the present invention, the steam reforming process may be operated at approximately 250 to 600 degrees celsius. For methanol reforming the operating temperature of the reformer would be approximately 250 to 300 degrees celsius.

To create an appropriate pressure differential at membrane tube 54, the liquid methanol and water should be pumped, i.e., provided by source 32, at approximately 6 to 20 atmospheres. The polishing step should be conducted at approximately one to three atmospheres within polishing region 66. The pressure within hydrogen transport region 64 is essentially equal to the pressure within polishing region 66. The reforming process should be operated at 6 to 20 atmospheres to provide a substantial pressure differential across membrane tube 54. Critical flow orifice 120 can be sized to provide a pressure drop from the reforming region 62 (6 to 20 atmospheres) to one atmosphere within the combustion region 60. The byproduct stream 105 thereby enters the combustion region 60 at approximately one atmosphere. This allows operation of the air supply at inlet 34 at approximately one atmosphere, and thereby allows use of an inexpensive air blower 36.

Dimensions for reformer 12 sufficient to feed a typical fuel cell 16 are relatively small. Ten liters per minute (21 cubic feet per hour) of hydrogen is sufficient to generate one kilowatt of electrical energy in fuel cell 16. A steam reformer 12 under the present invention sufficient to support a one kilowatt fuel cell 16 would be roughly three inches in diameter by 15 to 16 inches in length. To increase volumetric production, the length of reformer 12 could be increased or the diameter of reformer 12 could be increased. The volumetric production rate for reformer 12 is limited primarily by the area of membrane 56 exposed to the reforming process. Increasing the length of reformer 12 or the diameter of reformer 12 increases the exposed area of membrane tube 54 and thereby increases hydrogen output for reformer 12. However, multiple standard-sized reformers 12 may be employed in parallel within a common combustion zone.

Figure 4:
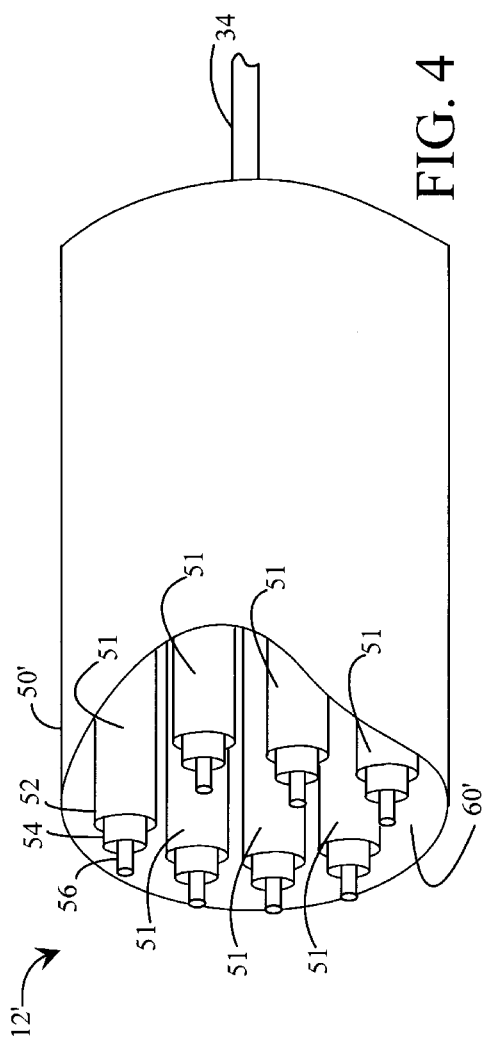
FIG. 4 illustrates schematically an alternate architecture for the steam reformer under the present invention nesting multiple reformer tubes within a common combustion region.

FIG. 4 illustrates schematically the architecture of an alternate reformer 12' with an enlarged outermost metal tube 50' defining a common combustion region 60'. Within the relatively larger combustion region 60', a plurality of reformer tubes 51, i.e., each a combination of a tube 52, a tube 54, and a tube 56, are arranged in spaced relation. While not shown in FIG. 4 for purposes of clarity, reformer 12' would include a feedstock inlet, a product hydrogen outlet, and a combustion gas outlet. A common air inlet 34 supplies air to the common combustion region 60'. As may be appreciated, each of reformer tubes 51 provides a byproduct stream 105 (not shown in FIG. 4) to the common combustion region 60'.

Returning to FIG. 3, reformer 12 must be initiated to operate. Generally, the reforming region 62 must be elevated to approximately 150 to 200 degrees celsius if methanol is the feedstock, or 300 to 500 degrees celsius if hydrocarbons are the feedstock. Once the reforming process begins, the byproduct stream 105, including by design a given amount of hydrogen as combustion fuel, enters the combustion region 60, encounters combustion catalyst 100, and combusts to thereafter thermally support the steam reforming process. The combustion catalyst only needs hydrogen present (mixed with air) to ignite the byproduct stream 105. The goal in starting reformer 12, therefore, is to simply elevate the reforming region 62 to approximately 150 to 200 degrees celsius (in the case of methanol reforming).

A simple cartridge-type electric resistance heater 140, either inserted into the reforming catalyst 102 or, as illustrated in FIG. 3, into the center of tube 56 initiates operation of reformer 12. Alternatively, a resistance heater may be used to heat the methanol and water feed provided at inlet 30. In either event, once the reforming catalyst 102 reaches a sufficiently high temperature (150 to 200 degrees celsius) the reforming reaction begins and the combustion catalyst 100 reacts with hydrogen present in byproduct stream 105. At this point, the electrical resistance heater 140 can be shut down. A 50 to 100 watt resistance heater 140 should be adequate, based on conventional thermal mass calculations, to sufficiently heat the reforming region 62 in a matter of minutes.

Thus, a steam reformer with internal hydrogen purification has been shown and described. The reformer of the present invention utilizes a single feed, e.g., a methanol and water or hydrocarbon and water mix, as both the chemical feed stock to support hydrogen reforming and also as a combustion fuel source to provide sufficient temperature to support steam reforming. Reformer 12 of the present invention recovers by design less than a maximum amount of hydrogen available in a reforming step to leave in the byproduct stream 105 sufficient hydrogen as fuel to support the combustion process. Reformer 12 of the present invention uses two distinct hydrogen purification processes. First, membrane tube 54 produces hydrogen stream 103 as a bulk filtration step, but the product hydrogen stream 103 may still contain some undesirable impurities. Second, a polishing process converts the undesirable impurities in the hydrogen stream 103 to innocuous components not affecting operation of the fuel cell 16. Advantageously, this allows use of a relatively less expensive, thin palladium-alloy membrane tube 54 in the steam reforming process. The overall concentric cylindric or nested architecture of reformer 12 provides a compact overall configuration with efficient internal heat transfer and heat utilization therewithin.

It will be appreciated that the present invention is not restricted to the particular embodiment that has been described and illustrated, and that variations may be made therein without departing from the scope of the invention as found in the appended claims and equivalents thereof.

What is claimed is:

1. A process for the production of hydrogen containing concentrations of carbon monoxide and carbon dioxide below a given level, comprising:
reacting steam and at least one of an alcohol vapor and a hydrocarbon vapor at a temperature approximately in the range of 200 degrees C. to 600 degrees C. and a total pressure of at least two atmospheres to produce product hydrogen, carbon monoxide, and carbon dioxide;
conducting said reacting step in the vicinity of a hydrogen-permeable and hydrogen-selective membrane whereby said product hydrogen permeates said membrane and concentrations of said carbon monoxide and said carbon dioxide above said given level permeate said membrane;
placing a methanation catalyst bed containing a methanation catalyst at the permeate side of said membrane;
providing means to heat the methanation catalyst to a temperature approximately in the range of 200 degrees C. to 600 degrees C. whereby said carbon monoxide and carbon dioxide permeating through said membrane convert to methane and yield a product hydrogen stream with concentrations of carbon monoxide and carbon dioxide below said given level; and
withdrawing said product hydrogen stream from said methanation catalyst bed.

2. A process according to claim 1 wherein said alcohol vapor is a methanol vapor and said reacting step occurs at a temperature approximately in the range of 200 degrees celsius to 400 degrees celsius.

3. A process according to claim 1 wherein between 50 percent and 80 percent of a theoretically available amount of hydrogen is recovered as said product hydrogen and the remaining amount of said theoretically available amount of hydrogen is withdrawin along with reforming byproduct gasses as a byproduct stream.

4. A process according to claim 3 wherein wherein said remaining amount of hydrogen in said by product stream is mixed with air and combusted to provide heat supporting said reforming step.

5. A steam reformer comprising:
a tubular hydrogen-permeable and hydrogen-selective membrane;
a first bed comprising a reforming catalyst and surrounding at least part of said membrane;
an inlet to said first bed receiving a mixture of steam and at least one of an alcohol vapor and a hydrocarbon vapor;
an outlet from said first bed releasing reforming byproduct gasses;
a heating element heating said first bed to an operating temperature approximately between 200 degrees C. and 600 degrees C.;
a second bed comprising a methanation catalyst placed at the permeate side of said membrane; and
a reformer outlet withdrawing hydrogen gas from said second bed.

6. A reformer according to claim 5 wherein said membrane comprises one of porous metal, porous ceramic, and porous carbon.

7. A reformer according to claim 5 wherein said membrane comprises non-porous hydrogen-permeable metal.

8. A reformer according to claim 7 wherein said membrane comprises at least one of palladium and palladium alloys.

9. A reformer according to claim 8 wherein said membrane comprises at least one of an alloy of palladium with 30–50 wt % copper, an alloy of palladium with 5–30 wt % silver, an alloy of palladium with 1–10% yttrium, and an alloy of palladium with 1–10% cerium.

10. A reformer according to claim 5 wherein said heating element comprises at least one radiant, electric resistive heating element.

11. A reformer according to claim 5 wherein said heating element comprises a third bed containing an oxidation catalyst arranged around at least a portion of said first bed such that said reforming byproduct gasses pass into said third bed, mix with an air source, catalytically ignite to generate heat, and discharge from said reformer.

12. A reformer according to claim 11 wherein said air source is heated prior to injection into said third bed.

13. A reformer according to claim 12 wherein said air source is heated by at least one of heat exchange with said hydrogen being withdrawn and said third bed.

14. A reformer according to claim 11 wherein a liquid methanol and liquid water feed is vaporized and preheated prior to injection into said first bed by heat exchange with at least one of said discharged purified hydrogen product stream or said combustion-gas discharge stream.

15. A reformer according to claim 11 wherein sufficient hydrogen remains in said reforming byproduct gasses passing into said first bed to provide when catalytically ignited sufficient heat to maintain said operating temperature.

16. A reformer according to claim 11 wherein said third bed operates at a total pressure less than a total pressure within said first bed.

17. A reformer according to claim 16 wherein said third bed operates at near ambient pressure.

18. A reformer according to claim 17 wherein a restricted orifices through which said reforming byproduct gasses flow from said first bed and into said third bed, causes a pressure differential between said third bed and said first bed.

19. A reformer according to claim 5 wherein at least one electric resistance heating element heats said first bed to said operating temperature.

20. A reformer according to claim 19 wherein said at least one heating element inserts into a bore of said tubular hydrogen-permeable and hydrogen-selective membrane.

21. A reformer according to claim 19 wherein said at least one heating element at least one of inserts into said first bed and surrounds the circumference of said first bed.

* * * * *

UNITED STATES PATENT AND TRADEMARK OFFICE
CERTIFICATE OF CORRECTION

PATENT NO. : 5,861,137
DATED : January 19, 1999
INVENTOR(S) : David J. Edlund

It is certified that error appears in the above-indentified patent and that said Letters Patent is hereby corrected as shown below:

In column 2, line 40, delete "eater" and insert --water-- therefor.

In column 3, line 63, delete "lose" and insert --loss-- therefor.

In column 4, line 11, delete "feed stock" and insert --feedstock-- therefor.

In column 8, line 20, delete "withdrawin" and insert --withdrawn-- therefor.

In column 8, line 22, after "claim 3 wherein" delete "wherein".

In column 8, line 23, delete "by product" and insert --byproduct-- therefor.

In column 10, line 2, delete "orifices" and insert --orifice-- therefor.

In column 10, line 3, after "third bed" delete ",".

Signed and Sealed this

Eighth Day of June, 1999

Attest:

Q. TODD DICKINSON

*Attesting Officer*  *Acting Commissioner of Patents and Trademarks*